July 6, 1937.   A. D. ROSE   2,085,926
COMBINED PRESSURE RESPONSIVE ELEMENT AND TRAP
Filed May 1, 1933
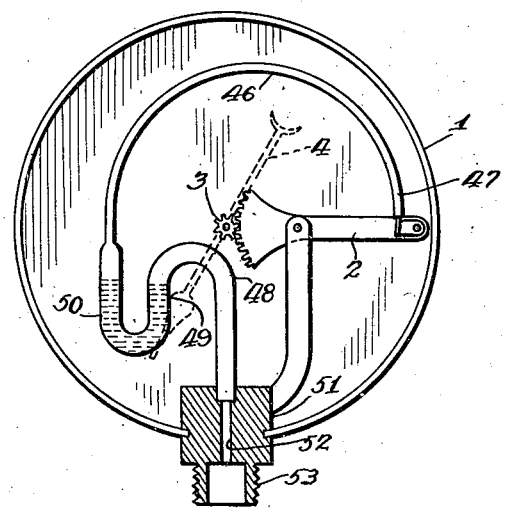
Inventor:
Alexander D. Rose
by Amos, Phipps, Olson & Mecklenburger
Attys.

Patented July 6, 1937

2,085,926

UNITED STATES PATENT OFFICE 2,085,926

COMBINED PRESSURE RESPONSIVE ELEMENT AND TRAP

Alexander D. Rose, Chicago, Ill., assignor to Jas. P. Marsh Corporation, Chicago, Ill., a corporation of Illinois Application May 1, 1933, Serial No. 668,756

8 Claims. (Cl. 73—109)

The invention relates to pressure gauges and primarily to those which employ a pressure responsive element and have combined therewith an indicator and mechanism for actuating the indicator, the latter being operable by the pressure responsive element.

The invention has among its principal objects the provision of a gauge having a trap for trapping air in the pressure responsive element of the gauge and thereby prevent this portion of the structure against becoming affected by the temperature of fluid contained in the system, and thus actuate the indicator and cause inaccurate indications of pressure contained in the system.

It is an object of the invention to form either the pressure responsive element or a member connected therewith in a manner to provide a trap.

Another object of the invention is to fashion the tubular pressure responsive element of the gauge so that one end of the tubular element provides a pressure responsive portion having another portion thereof fashioned to provide the trap, the latter preventing the temperature of fluid contained in the system from affecting the pressure responsive portion of the tube to thereby cause actuation of the same.

The invention has these and other objects, all of which will be explained in detail and more readily understood when read in conjunction with the accompanying drawing which illustrates an embodiment of which the invention is susceptible, it being therefore manifest that other changes and modifications may be resorted to without departing from the spirit of the appended claims forming a part hereof.

In the drawing there is shown a view of a structure involving a tube and trap, one end of the tube being responsive to pressure changes.

The structure shown in the figure illustrates a construction for providing a combined pressure responsive element and trap. The gauge comprises a gauge casing or housing 1 which is mounted upon the post 51. The movable end of the expansible element 46 is connected by the usual linkage mechanism 2 to the usual indicating mechanism 3 which causes the pointer 4 to play over the usual graduated dial associated with pressure gauges of this general character. This structure involves the use of a tubular element 46 which is closed at the end 47 and has means at this end for completing a connection between a mechanism for actuating an indicator. This tube may be of elongated cross section and of arcuate formation. The material adjacent the end 48 of the tubular element 46 is fashioned to provide a goose neck 49 which will thus form a trap 50 and prevent the escape of air confined within the tubular pressure responsive element 46. The end 48 of the tubular element 46 may be inserted in a post 51 which has a passage 52 and is provided with threads 53 whereby the structure may be applied for use by being associated with a system containing pressure which it is desired to gauge.

Manifestly, when the device is associated with a system, such as, for instance, a heating system, steam under pressure may enter the U-shaped member 48 and transmit pressure to the body of liquid 49 and the leg 50 causing that liquid to move and compress the air contained in the pressure responsive portion 46 of the tube. This compression will impart movement to the end of the tube 47, and since this end is connected with the indicating mechanism it is manifest that the indicator 4 will be actuated and thus indicate the pressure of the steam or other medium contained in the system, and will prevent this medium from entering the tubular portion 46 and thereby cause expansion and contraction, due to heat fluctuations, of said tubular portion and result in an inaccurate indication. Moreover, the structure just referred to will readily compensate for sudden fluctuations of pressure in the medium to be gauged and thus prevent them from being transmitted to the indicating mechanism for actuating the indicator and possibly causing injury thereto.

From the foregoing description of the invention, it is evident that a structure is provided which produces a combined pressure responsive element and a trap for trapping air in one end of the pressure responsive element which also prevents heated fluid contained in the system from entering the pressure responsive portion of the structure and thus insures against actuation of this last mentioned portion by a force other than pressure contained in the system which thus produces a gauge of greater accuracy as to indications of pressure.

Having thus described the invention, what I claim as new and desire to cover by Letters Patent is:

1. In a pressure gauge, an integral tubular member providing a combined pressure responsive element and a rigid trap respectively arranged adjacent the opposite ends of said tubular member, one end portion of said tubular member being curved and flexible to provide said pressure responsive element, the other end portion of said tubular element being rigid and bent to provide portions substantially parallel to each other and forming said trap.

2. A pressure gauge comprising a casing, a post supporting said casing and having a passage formed therein, an integral tubular member housed in said casing and having a rigid end portion including a trap extending a substantial distance outside said post and communicating with said passage, the opposite end of said member being flexible and responsive to pressure within said passage and tubular member, and indicating mechanism actuated by the flexible end of said tubular member.

3. A pressure gauge comprising a casing, a post supporting said casing and having a passage formed therein, an integral tubular member housed in said casing and having a rigid end portion including a trap extending a substantial distance outside said post and communicating with said passage, the opposite end of said member being flexible and responsive to pressure within said passage and tubular member and the rigid end portion of said tubular member being bent upon itself to form said trap, and indicating mechanism actuated by the flexible end of the tubular member.

4. A pressure gauge comprising a post having a passage formed therein, a continuous integral tubular member having a rigid end portion mounted on and extending a substantial distance outside said post and including a trap communicating with the passage formed therein, the opposite end of said tubular member being flexible so as to respond to pressure within said passage and tubular member and adapted for connection with indicator actuating mechanism associated with the gauge.

5. A pressure responsive instrument comprising a casing, means forming a fluid inlet, a pressure responsive device completely housed in said casing, and means for transmitting pressure from said inlet to said device, said means integrally formed with said pressure responsive device embodying a sediment trap in said casing designed to collect any sediment and keep the same out of the pressure responsive device.

6. In a pressure gauge, an integral tubular member providing a combined pressure responsive portion and a trap portion respectively arranged adjacent the opposite ends of said tubular member, said tubular member being curved and the pressure responsive portion thereof being flexible so as to move in response to pressure variations occurring within the tubular member and the trap portion thereof being inflexible and formed by two substantially parallel and contiguous sections of said tubular member.

7. In a pressure gauge, an integral tubular member providing a combined pressure responsive portion and a trap portion arranged respectively adjacent the opposite ends of said tubular member, the trap portion being rigid and formed substantially in U-shape and the pressure responsive portion being curved and possessing flexibility so as to respond to pressure obtaining in said tubular member.

8. A pressure gauge comprising a casing, an integral tubular member housed in said casing and providing a combined pressure responsive portion and a trap portion housed in said casing and respectively arranged adjacent the opposite ends of said tubular member, said tubular member adjacent one end thereof having an inverted substantially U-shaped portion one leg of which provides an inlet to said tubular member and the other leg of which provides an element of said trap portion, and said tubular member adjacent the other end thereof having a flexible arcuate section that provides the pressure responsive portion.

ALEXANDER D. ROSE.